Nov. 8, 1966     S. GRAY     3,284,722

LIGHT COUPLING DEVICE

Filed March 22, 1963

INVENTOR.
SIDNEY GRAY
BY
J. C. Whittaker
Attorney

United States Patent Office 3,284,722
Patented Nov. 8, 1966

---

3,284,722
LIGHT COUPLING DEVICE
Sidney Gray, Somerville, N.J., assignor to Radio Corporation of America, a corporation of Delaware
Filed Mar. 22, 1963, Ser. No. 267,298
10 Claims. (Cl. 331—94.5)

This invention relates generally to improved light coupling devices. In particular, this invention relates to an improved light coupling device for coupling the light from a first member having one index of refraction to a second member having a substantially different index of refraction.

Known fiber optic members, made of glass, quartz or similar transparent materials, are used widely for circuitous light paths. Usually, these devices comprise a concentric arrangement of two glasses in which the inner glass member has a lower index of refraction than the outer glass member. Thus, by internal reflection, the light is coupled from one end of the fiber optic member to the other. These devices are useful when it is desired to direct light between two members which have substantially the same index of refraction as does the inner glass of the fiber optic member.

However, if one attempts to connect a fiber optic member between a light emissive member having a first index of refraction and a light sensitive member having a substantially different index of refraction, a certain percentage of the light emitted is lost. The reason for this is that, when the light is incident on an interface between two members having different indices of refraction, a portion of the light is reflected by, and does not transverse, the interface.

Futhermore, when light is incident on such an interface, there is a critical angle in the medium of higher index of refraction, and light approaching an interface at an angle greater than this critical angle will not reach the light sensitive device. In addition to this, when light transverses an interface between two media having different indices of refraction, a certain percentage of the light is lost by reflections at the interfaces even though it is within the critical angle.

The relationship between the indices of refraction of the two bodies determines the critical angle outside of which radiation from a high index of refraction member cannot be accepetd by a low index of refraction member. Also, the ratio of the indices of refraction determines the amount of reflectivity which will occur at an interface between the two members.

It is, therefore, an object of this invention to provide an improved light conducting medium.

It is another object of this invention to provide an improved light conducting medium for use between two bodies which have substantially different indices of refraction.

A further object of this invention is to provide a novel radiation coupler for use between an optical radiator and an optically responsive device having substantially different indices of refraction.

These and other objects are accomplished in accordance with this invention by providing a continuous semiconductive body having a substantially uniformly graded index of refraction from one region of the semiconductive body to another, so that the index of refraction changes substantially continuously beween the two regions. The semiconductive body is uniformly graded so that the index of refraction varies between the two regions at a rate which approaches a mono-atomic change. The light conducting medium may be manufactured by combinations of single evaporations and co-evaporation of one or more high index of refraction semiconductive materials and one or more low index of refraction semiconductive materials to produce a gradually varying index of refraction.

The invention will be more clearly understood by reference to the accompanying drawings wherein.

Figure 1:
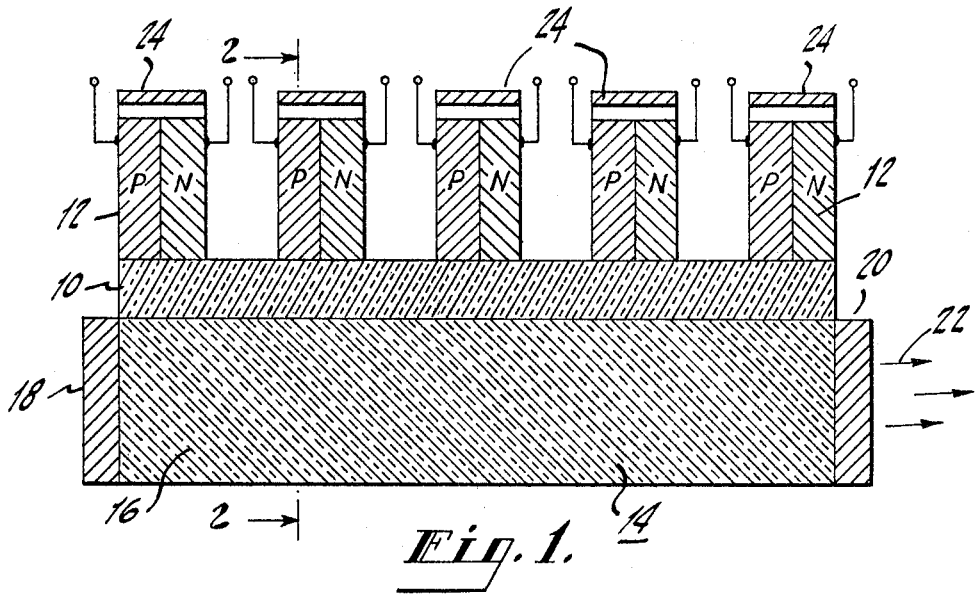
FIG. 1 is a sectional view of an optically pumped laser using this invention.

FIG. 1 shows an apparatus 10 for conducting light from a plurality of light emissive devices 12 to a light sensitive device or body 14. One or more light emissive devices 12 may be used. The light emissive devices 12 may each be, for example, a P-N junction formed of gallium arsenide that is doped with the appropriate materials for the P and N regions. Such light emissive junctions are well known and are known to emit light at a wavelength of approximately 917 A. Other light emissive devices also may be used, and the gallium arsenide light emissive junction 12 is illustrated as an example of this invention. A gallium arsenide P-N junction has an index of refraction $n$ approximately 3.5.

Spaced from the light emissive device 12 is a light sensitive device 14. The light sensitive device 14 may comprise any light absorber one example of which is an optically pumped laser. A laser generally includes an active material 16 which is a material having two energy levels which are separated by an amount corresponding to a characteristic output frequency. The active material 16 is characterized by the properties that: (1) its atomic particles can be optically excited into the higher of two energy levels, and thus an inverted population condition can be established, and (2) when the atomic particles return to the lower energy level, the active material emits light. The emitted light is such that, within the active laser material 16, an incident photon triggers an ion to emit a photon in phase with the incident photon. Thus, substantially all of the emitted light from the active material 16 is substantially in phase and is described as being a coherent light.

Positioned on the end of the active laser material 16 are light reflecting members 18 and 20 which form the boundaries of an optical resonant cavity. The light reflecting members 18 and 20 may be mirrors. The mirrors 18 and 20 are precisely oriented so that at least one resonant mode exists between the mirrors at frequencies for which the spacing therebetween corresponds to a path length of an integral number of half wave lengths of the emission. At least a portion of light reflecting surface 20 is at least partially transparent so that an output coherent light beam 22 may be obtained from the laser 14.

In the example illustrated, the pumping source for the laser 14 is a source of light including a plurality of P-N junctions 12. Thus, the pumping source is a source of optical energy which is used to excite the ions of the active laser material 16 into the higher energy level.

The pumping source, i.e., the light emissive devices 12, has an index of refraction of $n_1=3.5$. When the active laser material 16 is calcium fluoride doped with divalent dysprosium, which is a good, optically pumped, active laser material, the active laser material 16 has an index of refraction of approximately $n_2=1.3$.

The relationship between the indices of refraction of the sources 12 and the active material 16 determines the critical angle outside of which radiation from the high index of refraction, gallium arsenide source 12, cannot be accepted by the low index of refraction, calcium fluoride laser body 16. Expressed in mathematical terms this angle is $$\sin \theta = \frac{n_2}{n_1} = \frac{1.3}{3.5} = 0.37; \ \theta = 22°$$

Also the ratio of the two indices of refraction determines the magnitude of the reflectivity which will normally occur, at the interfaces between the bodies 12 and 16. However, the normal light reflections at the interfaces are substantially completely eliminated by the provision of the light conduit or light conductor 10 positioned between the light emissive devices 12 and the light sensitive device 16. The presence of the light conduit 10 will not alter the critical angle between the two bodies. However, the presence of the light conduit 10 will eliminate the light losses that occur for all of the light that is within the critical angle as this light traverses the various interfaces.

The light conduit 10 in the region just adjacent to the light emissive device 12 has an index of refraction that substantially matches that of the light emissive device 12, i.e., 3.5 in the example. Also, the index of refraction of the light conduit 10 in the region just adjacent to the light sensitive device 16, substantially matches the index of refraction of the light sensitive device 16, i.e., $n_2 = 1.3$ in the example. The balance of the light conduit 10 is made to have an index of refraction that gradually varies between the two extreme indices of refraction. Thus, the index of refraction of the light conduit 10 changes gradually, and continuously decreases from the higher to the lower value, from one extreme to the other, and the rate of change may be as gradual as desired and may even be made on the mono-atomic level.

As an example of manufacturing the light conduit 10, the gallium arsenide P-N junctions 12 may be formed on a wafer of gallium arsenide (not shown) by conventional methods. Then, the wafer and the junctions 12 may be used as a substrate for the deposition, by evaporation, of the light conduit 10. The deposition is arranged so that a film of entirely high (3.5) index of refraction material, e.g., antimony doped antimony trisulfide, is deposited directly on the light emitters 12 which will eliminate the interface between the emitters 12 and the light conduit 10. Then, as the evaporation proceeds, higher and higher fractions of a low index of refraction material, e.g., calcium fluoride, are introduced into the evaporant stream. As the conclusion of the deposition approaches, only the low index of refraction material is deposited. Thus, the final deposit of the conduit 10 is a deposit of material which substantially exactly matches the index of refraction of the active laser material 16. Then, the active laser crystal 16 is fixed to the exposed side of the film 10 by an optical cement, e.g., a mixture of resins such as Canada balsam. The optical cement is selected so that its refractive index substantially matches both that of the active laser material 16 and the adjacent side of the light conduit 10.

In the above described example, only two materials were described as forming a part of the light conducting medium 10. It should be understood that any of the known semiconductive materials, which is meant to include all of the III-V and the II-VI compounds of the periodic table and mixtures thereof, may be used with this invention.

Materials which are useful with their respective indices of refraction are as follows:

Materials having a high (approximately 3.5) index of refraction; (1) gallium arsenide, (2) antimony doped antimony trisulphide, and (3) arsenic selenide.

Materials having a low (approximately 1.3) index of refraction; (1) calcium fluoride, (2) magnesium fluoride, (3) lithium fluoride, and (4) sodium aluminum fluoride.

The above materials may be used either alone or in any desired combination.

It should be noted that the light conduit 10 is in physical contact with the opposite sides of the P-N junctions 12. Because of this contact, the light conduit should be made of a high electrical resistance material, for proper electrical operation of the P-N junctions 12. Similar electrical requirements exist when the light absorber is a device having potential applied thereacross.

Co-evaporation of two or more materials is a well known technique and is described in detail in many published patents and articles. Briefly, co-evaporation may be accomplished by adjusting the temperature of two or more evaporator boats to deposit a desired combination of materials in desired proportions onto a substrate.

Figure 2:
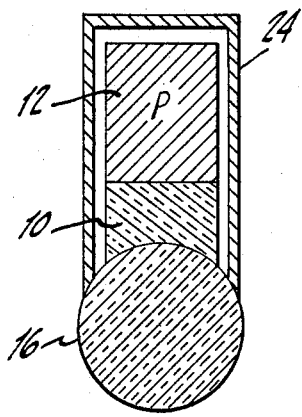
FIG. 2 is an enlarged sectional view taken along line 2—2 of FIG. 1.

As shown in FIGS. 1 and 2, a plurality of light reflectors 24 are used each of which is positioned adjacent to and around one of the P-N junction light sources 12. These light reflectors, which may be mirrors or other similar devcies, are for reflecting any light which may be emitted in this direction back toward the active laser body 16.

Figure 3:
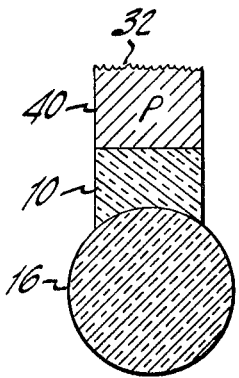
FIG. 3 is an end sectional view of an embodiment of this invention.

The efficiency of the light transfer can be furthered by roughening the face or surface 32 of a P-N junction 40 which is remote from the light conduit 10 as shown in FIG. 3. By use of this technique, light which is not transferred to the laser body 16, because its path within the P-N junction 40 is outside of the critical angle, will be scattered at the reverse face 32. The scattering will change the incident direction of some of the light in its next pass through the P-N junction 40 so that some of this light may now fall within the critical angle. When the scattered light is within the critical angle, it will be efficiently coupled to the active laser body 16 by the light conductor 10 as has been explained. This embodiment may also be used with one or more light reflectors.

In all of the drawings, the sizes of the various components have been greatly exaggerated for simplicity of illustration. In actual practice, the laser rod 16 would be about ¼ inch in diameter and 1 to 1.5 inches long; the light conductor 10 would be about 1 mil, or less, thick, and the P-N junction would be about 20 mils square. Although P-N junctions 12 are shown as positioned on one side only of the active laser rod 16, it should be understood that more pumping sources may be positioned in other regions around the rod 16.

A light conductor may thus be interposed between an electrically energized P-N junction producing incoherent radiation and an optically pumped laser. The light conductor can also be used between known electrically pumped lasers, producing coherent radiation, such as gallium arsenide P-N junctions, and an optically pumped laser. In this alternative, the vast majority of the light produced is emitted substantially parallel to the P-N junction so that the problems of the critical angle do not occur.

The light conductor 10 may also be connected to other types of light emitters and to different types or numbers of absorbers, e.g., photosensitive devices. In fact, one light emitter may be connected to a plurality of light absorbers for uses such as in an optical type computer.

What is claimed is:

1. A light conducting medium comprising a layer of evaporable material, the composition of said layer varying from one side to the other whereby the index of refraction of said layer varies from said one side to said other.

2. A light conducting medium comprising a layer of evaporable semiconductive materials, the composition of said layer varying continuously from one region to another region whereby the index of refraction of said layer varies from said one region to said other region.

3. A light conductor comprising a continuous body of semiconductors including at least two regions, said body having one index of refraction at one of said regions and a different index of refraction at the other of said regions, and the index of refraction of said semiconductive body varying substantially continuously from one of said regions to the other of said regions.

4. A light conductor comprising a continuous body of semiconductors including at least two regions, said body having one index of refraction at one of said regions and a different index of refraction at the other of said regions, and the index of refraction of said semiconductive body varying substantially continuously from one of said regions to the other of said regions, and the index of refraction of said semiconductive body decreasing substantially continuously from one of said regions to the other of said regions.

5. A light conduit for use between at least one source of light and an optically pumped laser device comprising a body of semiconductive material, said body of semiconductive material having an index of refraction which varies substantially continuously from one substantially matching that of said light source to one substantially matching that of said laser.

6. A light conducting system comprising a light emitter, a light conduit contiguous with said light emitter, a light absorber contiguous with said light conduit, said light conduit being a semiconductive body, and the index of refraction of said semiconductive body varying substantially continuously from said light emitter to said light absorber.

7. A light conducting system comprising a light emitter, a light conduit abutting said light emitter, a light absorber abutting said conduit, at least one of said light emitter and said light absorber being a laser, said light conduit being a semiconductive body, and the index of refraction of said semiconductive body varying substantially continuously from said light emitter to said light absorber.

8. A light conducting system comprising a light emitter having a first index of refraction, a light conducting semiconductor abutting said light emitter, a light absorber having a second index of refraction, said light absorber abutting said light conducting semiconductor, the index of refraction of at least a region of said semiconductor varying substantially continuously from said first index of refraction to said second index of refraction.

9. A light conducting system as in claim 8 wherein at least one of said light emitter and said light absorber is a laser.

10. A light conducting system as in claim 8 wherein said light conducting semiconductor consists essentially of evaporable materials.

No references cited.

JEWELL H. PEDERSEN, *Primary Examiner.*

WILLIAM L. SIKES, *Assistant Examiner.*